United States Patent [19]

Tulpule et al.

[11] Patent Number: 4,771,427
[45] Date of Patent: Sep. 13, 1988

[54] EQUALIZATION IN REDUNDANT CHANNELS

[75] Inventors: Bhalchandra R. Tulpule, Vernon; Robert E. Collins, East Hartford; Donald F. Cominelli, Southington; Richard D. O'Neill, South Windsor, all of Conn.

[73] Assignee: United technologies Corporation, Hartford, Conn.

[21] Appl. No.: 914,698

[22] Filed: Oct. 2, 1986

[51] Int. Cl.⁴ .............................................. G06F 11/16
[52] U.S. Cl. .......................................... 371/8; 371/36
[58] Field of Search ............................ 371/8, 9, 36, 68; 455/8

[56] References Cited

U.S. PATENT DOCUMENTS

| | | | |
|---|---|---|---|
| 3,805,235 | 4/1974 | Foster | 371/68 X |
| 4,477,895 | 10/1984 | Casper | 371/68 X |
| 4,497,059 | 1/1985 | Smith | 371/36 |
| 4,532,630 | 7/1985 | Corney | 371/68 |

Primary Examiner—Jerry Smith
Assistant Examiner—Robert W. Beausoliel
Attorney, Agent, or Firm—Francis J. Maguire, Jr.

[57] ABSTRACT

A miscomparison between a channel's configuration data base and a voted system configuration data base in a redundant channel system having identically operating, frame synchronous channels triggers autoequalization of the channel's historical signal data bases in a hierarchical, chronological manner with that of a correctly operating channel. After equalization, symmetrization of the channel's configuration data base with that of the system permits upgrading of the previously degraded channel to full redundancy. An externally provided equalization command, e.g., manually actuated, can also trigger equalization.

7 Claims, 5 Drawing Sheets

| COMPUTATION SEQUENCE | EQUALIZATION SEQUENCE |
|---|---|
| NZ | NZ |
| AIR DATA 1 | AIR DATA 1 |
| NZD | NZD |
| FILTER 1 | FILTER 1 |
| SW15 | SW15 |
| GAIN 1 | GAIN 1 |
| FILTER 2 | FILTER 2 |
| GAIN 2 | GAIN 2 |
| SW1 | SW1 |

EQUALIZATION IN REDUNDANT CHANNELS

The invention described herein was made in the performance of work under NASA Contract No. NAS2-11771 and is subject to the provisions of Section 305 of the National Aeronautics and Space Act of 1958 (72 Stat. 435; 42 U.S.C. 2457).

CROSS REFERENCE TO RELATED APPLICATION

The invention described herein may employ some of the teachings disclosed and claimed in commonly owned co-pending application filed on even date herewith by Tulpule et al, U.S. Ser. No. 914,697, entitled SYMMETRIZATION FOR REDUNDANT CHANNELS, which is hereby expressly incorporated by reference.

TECHNICAL FIELD

This invention relates to redundant channels used in a control system for improving system availability and, more particularly, to a method and means for automatically restoring an incorrectly operating healthy channel to one operating identically to the other redundant channels.

BACKGROUND ART

In critical control applications, the use of redundancy is commonplace for improving the realiability of the system. Various techniques have been developed for reliable operation of redundant channels including interchannel frame synchronization, voting planes, etc. These techniques are designed to improve the fault detection and isolation (FDI) and fault tolerance capabilities of the system and to guarantee identical operations as well as graceful degradation in the presence of asymmetrical events and transient faults as long as they are simplex in nature.

Notwithstanding the capabilities of these FDI and fault tolerant techniques, the possibility of degraded or non-identical system operation cannot ever be prevented. The reasons for degradations can be many and include such normal events as temporary loss of power or abnormal events and false alarms such as asymmetrical transients, multiple simultaneous failures and dissimilar information faults. The last of these events is called the "Byzantine General's" problem in which a (sub)system transmits different information to different other subsystems causing divergence and can ultimately lead to catastrophic loss of an otherwise properly functioning, healthy system. (It is evident that if a "Byzantine General" gives conflicting battle plans to his field commanders then he will lose the battle. This is particularly apropos in the context of a redundant channel avionic control system as used in military fighter aircraft.)

The fault tolerant character of the system demands that it be capable of upgrading or "healing" a channel indicating faulty operation which is in fact not truly misoperating but is merely experiencing a transient. It is important to make this upgrade smoothly, i.e., without disturbing the unaffected operating part of the system. Current practice is to reinitialize a channel which is indicating faulty operation. The thinking is that this reinitialization will ultimately lead to convergence of the reinitialized channel with the other channels under the influence of appropriate functional signal stimuli. However, according to the teachings of the present invention, to be fully disclosed below, it can be shown that the reinitialized channel's information data base cannot be guaranteed to be made identical to the system data base in the unaffected channels using this approach. In fact, under appropriate conditions it can diverge sufficiently to give the appearance of a channel failure as detected by an output voting plane.

Thus, it is thought in the art that if the selected initialization values are derived on line using the upcoming channel's own data base, and the output of dynamic functions in a cycle such as filters, etc., are repeatedly used as back values for the next cycle that the "transients" will eventually die down. However, as pointed out above, this technique cannot guarantee identicality. Similarly, the technique for forcing convergence of dynamic elements between the affected and unaffected channels also fails to guarantee identicality. Furthermore, such an approach produces limited transients in the unaffected channels and is, therefore, unacceptable.

Another technique, i.e., of initializing the information in all channels to a known state can produce extremely large transients in the system outputs and must, therefore, be also considered unacceptable.

DISCLOSURE OF THE INVENTION

The failures of these and other "convergence" techniques can be traced to the nature of digital arithmetic computation. An arithmetic computation in a digital computer, unlike an analog computer, requires representation of numbers with a finite precision or word length regardless of the fixed or floating point format. In a set of identically operating channels the signal and configuration data bases are bit for bit identical and contain historical information in the form of back values of filters, command gains, switch positions, etc. It is important to note that this identical, historical data base is continually, hierarchically and chronologically being updated by the system. By hierarchical is meant that control laws are executed in a series of ordered steps. By chronological is meant that the steps are ordered according to time of occurrence. When a channel degrades, the symmetry of its historical data base is lost forever and cannot simply be recaptured by reinitializing and returning the channel to normal on-line operation.

Therefore, an object of the present invention is to provide a systematic procedure for making a suspect channel's historical signal data base, including the entire representation of all of the historical data base in memory, equal to that of a properly functioning channel in an identically operating multichannel system.

According to the present invention, a hierarchical, chronological update of the historical data base of a suspect channel is effected, upon request, using the corresponding data bases of the unaffected channels. The implemention of the procedure relies on communication paths which are usually present in a redundant system for the purpose of exchanging functional signals and other information. It should be noted that these communication paths, or cross-channel data links (CCDLs), are embedded in the very architecture of redundant systems and are not required to be deployed for the specific purpose of equalization. The invention disclosed herein merely relies on these communication paths (but is not limited by them) for the purpose of transmitting historical information between channels. The equalization procedure described in detail herein essentially consists of updating, via the CCDL, the historical data bases of the channels being restored in the hierarchical, chronological update sequence consistent with the normal computation sequence of the involved parameters. The procedure may also be thought of, absent the time element, as a hierarchical updating in the sense that the computational steps must be executed according to a known sequence in which each function or step must be executed before another all the way through the computational frame. Of course, the time element is introduced by virtue of the synchronous operation of the redundant channels.

In other words, for example, if a normal computation sequence in a typical control law (normally implemented in software) includes the filtering of an input signal and then its amplification at a selected gain, the exact historical data in the good channel's filter is transmitted over the CCDL and is used to update the historical data used by the corresponding filter in the (suspect) channel being "healed" before the input signal is filtered and before it is amplified in the suspect channel. Similarly, the exact selected gain from the "good" channel will be transmitted for updating the corresponding amplifier in the suspect channel before the filtered signal is amplified.

The equalization procedure disclosed herein usually spans many computation frames due to the inherently limited capacity of the CCDL's in comparison with the large number of parameters to be equalized. However, the procedure guarantees identicality of filter back values, etc., because it relies on the repeatable nature of digital computations. Thus, when all inputs and back values or historical data into a function are guaranteed to be bit for bit equalized, and all future inputs are guaranteed to be equal due to voting planes, the outputs of the function as well as the future back values are also guaranteed to be identical in different channels in the absence of failures. Thus, when an attempt to equalize a channel fails, it can be uniquely isolated to a faulty channel.

When the equalization of a channel is requested, the unaffected channels begin transmitting the historical parameters generated after the completion of the computations from a given frame over the CCDLs to the upcoming channel which, in turn, hierarchically updates its corresponding parameter values in the correct chronology before beginning the next set of computations. This hierarchical, chronological updating technique is the key element for the success of the equalization procedure disclosed herein.

There exists another type of information data base which plays a key role in autoequalization and which is also "equalized" as a consequence of using the techniques disclosed herein in conjunction with symmetrization, performed after equalization. By autoequalization is meant an equalization of a channel which takes place automatically, upon the detection of a problem in a channel's local configuration data base. Autoequalization is distinguished from simple equalization by the nature of the initiating or requesting signal. In equalization, the request is generated externally, e.g., by a pilot, i.e., in a nonautomatic fashion.

In each channel of an identically operating redundant channel system, there exists a Channel Configuration Data Base (CCDB) and a System Configuration Data Base (SCDB) such as more fully disclosed in co-pending application U.S. Ser. No. 914,697, entitled Symmetrization for Redundant Channels, incorporated herein by reference. A symmetrization routine examines, in each channel, all of the redundant CCDBs available over the Cross-Channel Data Links (CCDLs) and combines them into a SCDB which then governs logical control of all state based decisions including voting plane configurations. Since all channels perform this symmetrization operation simultaneously from identical information (CCDBs, using a symmetrical system architecture), channel operations are symmetrical and lead to computations of identical outputs using identical (voted) inputs and bit for bit identical back values.

Therefore, another object of the present invention is to provide a systematic equalization procedure, as described above, which has the effect, in conjunction with symmetrization, of making a suspect channel's configuration data base (CCDB) equivalent to that of a properly functioning channel.

In the past, when an asymmetric or transient failure such as a fault induced by the "Byzantine General's" problem occurred in the CCDL or any other input element of the system in such a way as to affect the configuration or data base of only a subset of the channels, the failure was detected and isolated at the voting planes and the voting plane was reconfigured. The system then continued to operate without a channel degradation and shutdown, but with a reduced level of redundancy at the affected voting plane or planes. The system was then left vulnerable to any subsequent failures, real or transient, which could lead to channel shutdown. There was no built in mechanism to automatically "heal" the degradation in the configuration caused by such a transient or asymmetrical failure. The affected voting plane cannot simply be abruptly upgraded, due to the presence of historical data bases associated with the degraded configuration.

However, in further accord with the present invention, the equalization technique used for restoring a shutdown channel by updating the historical signal data base in the affected channel has the effect, by way of symmetrization, of upgrading the configuration data base existing in the local suspect channel. The voting plane(s) can then be "reconfigured up" and the system smoothly restored to its full level of redundancy in the presence of transient and asymmetrical faults.

The autoequalization procedure disclosed herein is triggered by a discrepancy between the above described Channel Configuration Data Bases (CCDBs) generated by each of the redundant channels. The CCDB's are voted to generate the system configuration data base (SCDB) which is in turn used in each channel to drive all computational tasks. The SCDB is also compared, in each channel, to the individual CCDB. Any channel in which the CCDB differs from the SCDB is considered a candidate for autoequalization. The unaffected channels transmit their historical information associated with the degraded voting plane over the CCDLs. The affected channel then autoequalizes itself in a hierarchical, chronological manner according to an equalization process as described above. The affected voting plane or planes are then upgraded smoothly by all channels by way of symmetrization.

The techniques of equalization and autoequalization taught herein represent a very significant improvement over the prior art. They are designed to provide guaranteed fault tolerant restoration and self healing in identically operating channels in a redundant channel system and to generate identical outputs in the presence of asymmetrical and transient faults and thus represent a major advance in the art.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
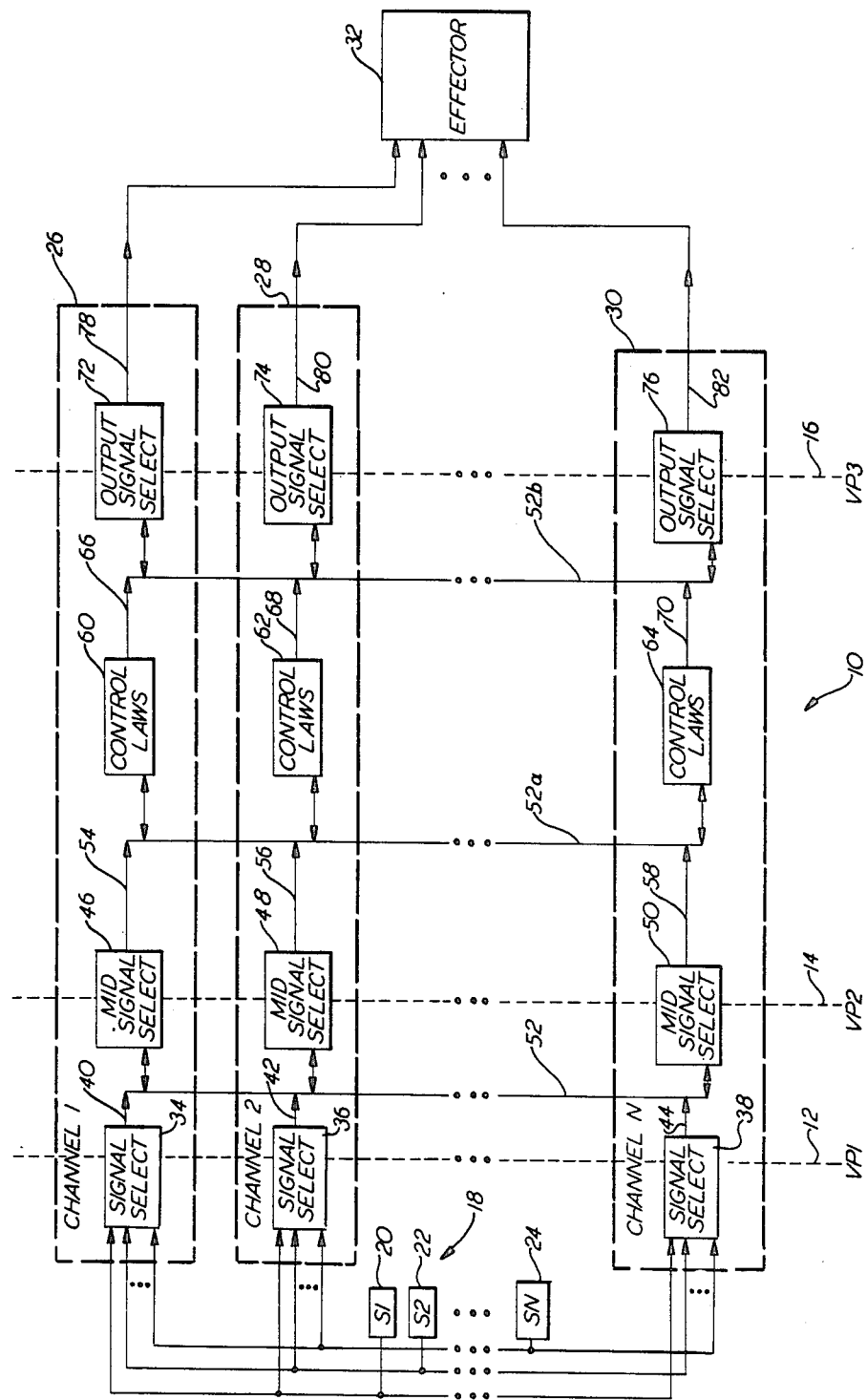
FIG. 1 is a simplified block diagram illustration of a redundant channel system showing portions of the channels relevant to the present invention.

FIG. 1 is an illustration of signal flow in a redundant channel control system architecture. Redundancy management techniques are applied at three voting planes, i.e., an input signal voting plane 12 (VP1), an intermediate signal voting plane 14 (VP2), and an output signal voting plane 16 (VP3). The redundancy management techniques associated with voting planes are embedded in software. The number and types of voting planes illustrated are for illustrative purposes only and are not intended to limit the applicability of the invention in any way.

The input signal redundancy management procedures at the input voting plane 12 consist of two basic steps: (i) signal selection and reconfiguration; and (ii) failure detection and isolation.

Various groups of redundant sensor sets will exist in the system such as one such set 18 illustrated in FIG. 1. For example, the set 18 of sensors S1, S2, ... SN, i.e., 20, 22, ... 24, might represent redundant analog or digital sensors for one of the three different types of rate gyros (pitch, yaw, roll) in a typical aircraft. Thus, it will be understood that the sensor set 18 illustrated in FIG. 1 is merely one set among many such sets which might include any type of input information, such as accelerometers, pilot sensors, angle of attack sensors, position sensors, air data sensors, etc. Similarly, it will be understood that the redundant channel system 10 illustrated in FIG. 1 includes several channels 26, 28, 30 which are merely very general representations of channels which, in reality, are considerably more complex. Only the general outlines of each of the channels with respect to one sensor set 18 and one related effector or actuator 32 is illustrated in FIG. 1. In reality, it will be understood, that many such sensor sets and effectors are within such a system. Each such effector will in general be controlled by a unique control law responsive to various sensors within the system. However, the general principles disclosed in connection with FIG. 1 and the remainder of the Figures and the specification below are generally applicable to all such sensor or input information sets and effectors controlled by the various channels.

The first voting plane (VP1) signal select blocks 34, 36, 38 will employ an algorithm to select an appropriate signal value on lines 40, 42, 44. The algorithm used may include taking an average of signals within an acceptable band of values or any such similar selection method.

For example, three sensors may be used to select a mid value for subsequent control computations. When one of these three sensors fails, it is detected, isolated and replaced by the fourth sensor in a mid value selection process 46, 48, 50. Upon detection and isolation of a second failed sensor, a switch to the average value of the remaining two sensors for control or computations is made. Should a third failure be detected, the reconfigured duplex set is considered faulted and may be removed from the computational process.

The second voting plane 14 illustrated in FIG. 1 is applicable only for reselecting among the input signals selected at the first voting plane 12. The redundancy management procedure applied at this and other voting planes may be identical to or a subset of the redundancy management algorithm used at voting plane 1 depending on the application.

This voting plane may invoke mid value voting among those selected signals which are digitally cross-strapped and placed symmetrically into memory blocks in each channel. Under no failure conditions the selected signals from VP1 input into the second voting plane would be identical in all channels in the absence of asymmetrical events or faults, including Byzantine faults, leading to dissimilar signals and/or configuration data bases. Since all channels select the identical mid value in the absense of failures, the input data base in all channels is fully symmetrical. As a result, the outputs of each channel are guaranteed to be bit-for-bit identical if the historical information data bases are held identical.

The selected signals 54, 56, 58 from the second voting plane are provided to control law blocks 60, 62, 64 which contain all of the control laws required to be executed on the input signals 54, 56, 58. These may include typical control laws including simple lead-lag filters, first order lag filters, quadradic filters, quadradic ratio filters, integrators, differentiators, switches, etc.

Any of these control law elements for example, a second order filter, may be represented as a transfer function responsive to an input stimulus x(n) for providing an output signal y(n) as follows:

$$y(n) = x(n) + [a_1[x(n-1)] + a_2[y(n-1)]]$$

It will be observed the after the x(n) expression in the above difference equation there is an expression in brackets which describes the historical values associated with that filter at any given point in time. It is these back values that must be equalized, according to a central teaching of the present invention, in healing a suspect channel.

The control laws and voting plane elements in a suspect channel will be equalized over cross-channel data links 52a by transmitting historical values from corresponding control laws and voting plane elements in one of the "good" channels. Thus, if control laws in block 60 are subject to an equalization procedure, there will be a transmission of historical data from control laws 62 and 64 to control laws 60. Of course, control laws 62 and 64 are identically operating and therefore the choice of which one to select is immaterial. However, in order to prevent the system from perpetuating a fault caused, for example, by the Byzantine General's problem, the parameters from blocks 62 and 64 can be compared and used in block 60 only if they are identical, thereby adding another degree of fault tolerance to the system.

Figures 2, 3:
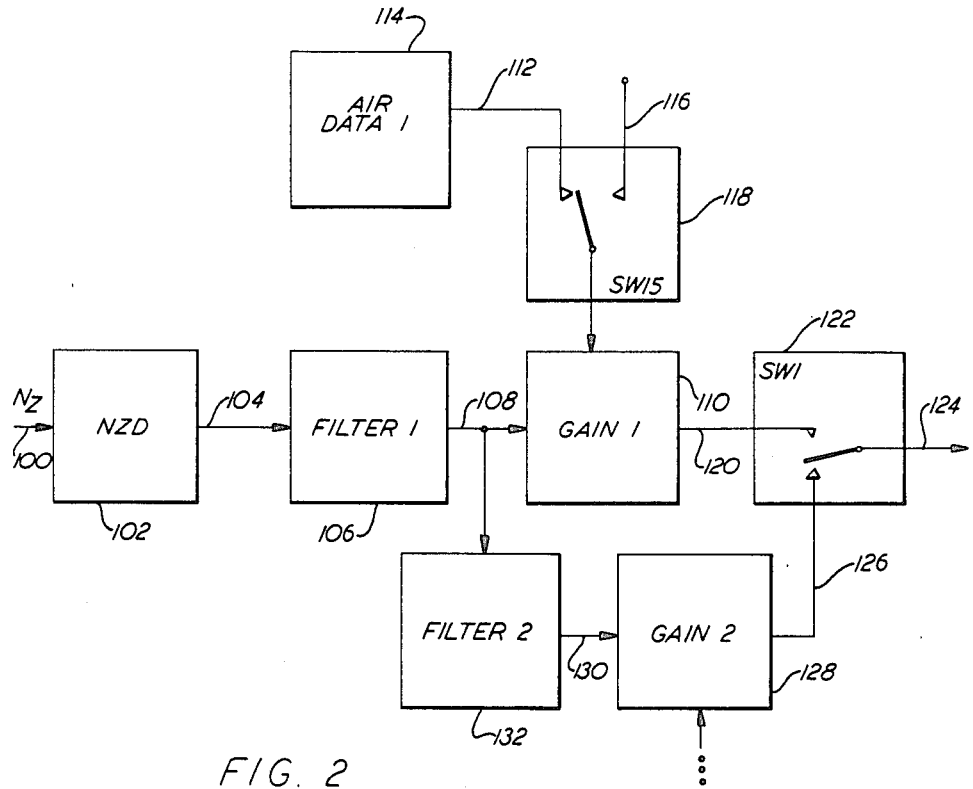
FIG. 2 illustrates a typical control law.
FIG. 3 illustrates a computation and update sequence for the control law of FIG. 2.

Referring now to FIG. 2, a typical "control law" for an aircraft application is illustrated. A normal or vertical aircraft acceleration signal on a line 100 is provided to a functional block 102 which may include a correction factor or some other function. A corrected signal value on a line 104 is provided to a FILTER 1 block 106 which may include a first order lag filter having historical back values. It is filters such as these which contain historical information which must be chronologically updated over one or more of the CCDLs 52, 52a, 52b of FIG. 1. A filtered signal value on a line 108 is provided to a GAIN 1 unit 110 which is responsive to an AIR DATA 1 signal on a line 112 from an air data signal source 114. Instead of air data, an alternate value may be provided from a different source on a signal line 116 depending on the position of a switch 118. The air data or alternate values will determine the gain in the gain unit 110. The signal output of gain unit 110 is provided on a line 120 to a switch unit 122 which may provide it as an output signal on a line 124 to, for example, other control laws.

Switch 122 may instead obtain its output signal from a signal on a line 126 from a gain unit 128 which in turn responds to an input signal on a line 130 from a FILTER 2 132 which is responsive to the signal on line 108 from filter 106.

The control law illustrated in FIG. 2 has no particular significance in and of itself for the disclosure of the invention claimed herein. However, it is illustrative of a typical control law which may be redundantly included in each of the control laws 60, 62, 64 of FIG. 1. As such, according to the present invention, if a channel is involved in an equalization procedure, it will either provide or be the recipient of historical values, depending on whether the control law is resident in a channel requesting equalization or being requested to supply historical data to such a channel.

Referring now to FIG. 3, which will be referred to in conjunction with FIG. 2, it will be observed that the normal computation sequence for the control law illustrated in FIG. 2 is laid out there in a vertical format indicative, from top to bottom, of the normal computational sequence executed by the control law of FIG. 2. It is a central teaching of the present invention that the historical updating sequence required for a system subject to an equalization procedure is to transfer the historical signal value for a particular filter, switch, etc., after executing that particular unit of the control law in the providing channel (operating correctly) and before executing that control law unit in the next cycle in the receiving channel (operating incorrectly). For example, if channel number 1 of FIG. 1 needs to be equalized and channel number 2 is selected as the channel to provide the historical data, then if filter 106 in channel 1 is about to process an identical (corrected) signal on line 104, the filter 106 must first be updated using the last frame's historical data resident in the corresponding filter 106 in channel 2 over CCDL 52a after it has been computed in the previous frame.

Furthermore, once this historical filter data is transferred and utilized, the filtered output signal on line 108 in channel 1 will be identical to the corresponding channel 2 signal on line 108 and as long as the signal inputs on line 104 are identical, it will stay identical. Having done this, the historical data in gain 110 in channel 1 can be updated using the corresponding channel 2 data base in order to equalize output 120. The other computations in the sequence are similarly hierarchically and chronologically constrained by the imposed execution/equalization sequences shown in FIG. 3. This is a good example of what is meant by a hierarchical, chronological updating.

Referring now back to FIG. 1, the control laws in each channel will provide output signals on lines 66, 68, 70 to output value command blocks 72, 74, 76 which in turn provide output signals on lines 78, 80, 82 to effector 32. Each control signal may contribute a portion or all of the command signal necessary to drive the effector.

A voting plane 16 associated with the output signal selection blocks 72, 74, 76 is required to compare the cross-strapped signals with each other to detect and isolate a faulty command. The commands should be bit-for-bit identical in a non-failed state, and should lead to rapid failure detection and correct isolation of the faulty channel. Alternatively, the signal comparison technique may be chosen in order to provide an added degree of fault tolerance and avoid repeated equalization requests.

Figure 6:
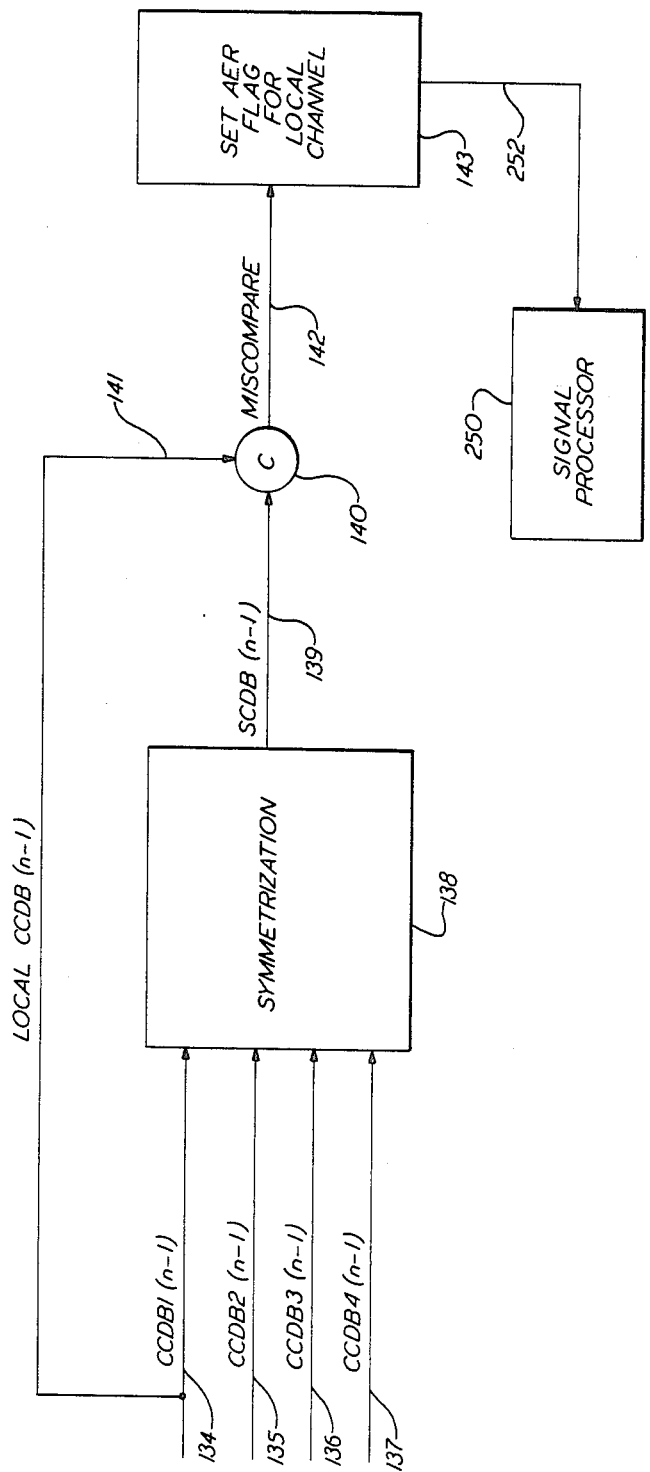
FIG. 6 is a flowchart illustration of the generation of the autoequalization request (AER) flag.

FIG. 6 is a partial illustration of the mechanization of a special case of using symmetrization, for purposes of detecting a need for equalization, i.e., autoequalization. Reference is made to co-pending application U.S. Ser. No. 914,697 for a more complete disclosure of the symmetrization process itself. The signal on line 139 of FIG. 6 of this patent specification corresponds to the signal on line 70 of FIG. 2 of that specification. The illustration of FIG. 6 herein is for a single channel, e.g., channel number 1 in a four channel system. A plurality of channel configuration data base (CCDB) signals on lines 134, 135, 136, 137 from, respectively, channels 1, 2, 3, 4, are received over cross-channel data links similar to those shown in FIG. 1 and are presented to a channel 1 symmetrization vote as indicated by a voting process 138. Each of the CCDBs received are from the just completed (n−1) computational frame. The voting process produces a voted System Configuration Data Base [SCDB(n−1)] signal on a line 139 which is presented to a comparator 140 in which a comparison is made between the voted SCDB (n−1) and the local version thereof as indicated by a signal on a line 141. Of course CCDB signal lines and the SCDB signal lines illustrated in FIG. 6 are each, in reality, many signals comprising a complete configuration data base. If the comparison determines that the two compared configuration data bases are different in some way, than a MISCOMPARE signal on a line 142 is provided to a block 143 in which steps are taken to set an autoequalization request (AER) flag for the local channel. Once the equalization process is completed a new symmetrization vote will take place in the local channel and the previously degraded portions of the local channel may now be upgraded.

Figure 4:
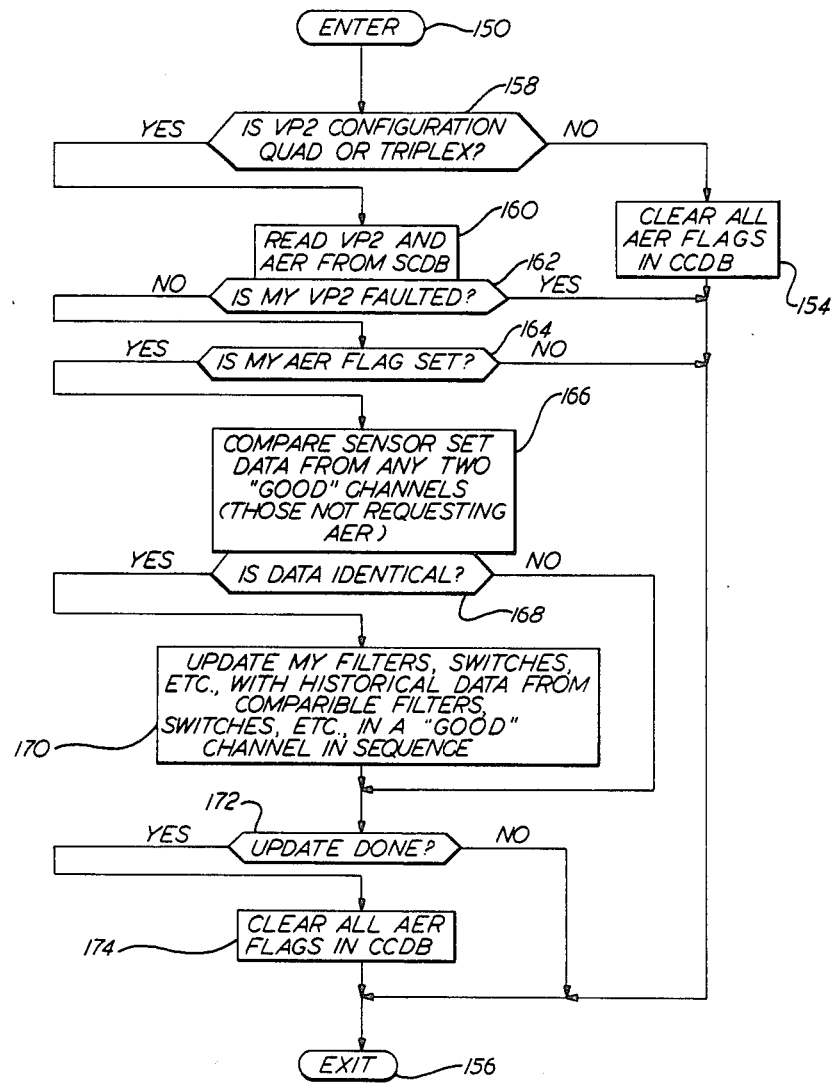
FIG. 4. is a flowchart illustration of an autoequalization request subroutine.

Referring now to FIG. 4, an illustration of a subroutine, or logical steps which may be executed in a channel of a typical quadraplex system to effect autoequalization at voting plane 2 (VP2) when requested. It will be understood that a similar procedure can be used to perform autoequalization at any other voting plane or planes. The following discussion is based on the VP2 equalization case. The flowchart of FIG. 4 may be characterized as describing "autoequalization receive" processing to determine if voting plane 2 should be the recipient of autoequalization and, if so, taking the necessary steps. Beginning with a step 150 in which the subroutine is first entered, a step 158 is next executed in which it is determined whether the configuration at voting plane 14 of FIG. 1 is, for a quadraplex system, still quad or at least still triplex. In other words, has the quad system degraded below triplex to duplex? If so, the system has degraded to a point where majority votes are no longer meaningful and hence autoequalization will not be executed. Therefore, all AER flags are cleared in the CCDB, as executed by step 154, and an exit is then made via step 156 from the subroutine. If the configuration at voting plane 2 is still quad or triplex, a step 160 is next executed in which the channel's System Configuration Data Base (SCDB) is read to determine the system status, as understood by the channel, including any autoequalization requests within the various channels in the system.

A step 162 is next executed in which the data in the subject channel at voting plane 2 is compared to the data contents of the other channels in the system as communicated over the CCDLs. This step corresponds to the comparison 140 of FIG. 6. If a determination is made in step 162 that the channel's voting plane 2 is faulted then an exit is made via step 156 from the subroutine and other steps may be taken, including the setting the channel's AER flag as in the step 143 of FIG. 6. (Such a step could easily be interposed between steps 162 and 164 to save an exit and later return if no other tasks need be completed outside the subroutine before executing step 166.)

If it is determined in step 162 that the channel's voting plane 14 is not faulted, a determination is next made in a step 164 as to whether or not the channel's AER flag is set. If not, an exit is made in step 156. If so, the step 166 is next executed in which a comparison of the sensor set data from any two "good" channels (those not requesting AER) is made. If the data is identical, as determined in a step 168, the channel's filters, switches, etc., are updated in a hierarchical, chronological manner with historical data from comparable filters, switches, etc., in one of the "good" channels, as indicated in a step 170. If the data was determined not to be identical in step 168, step 170 is bypassed and a step 172 is executed directly in which a determination is made as to whether or not the update has been completed. If not, an exit is made in step 156 and another pass through the subroutine may be made later. If so, all AER flags in the channel's CCDB are cleared in a step 174 and an exit is made in step 156.

Figure 5:
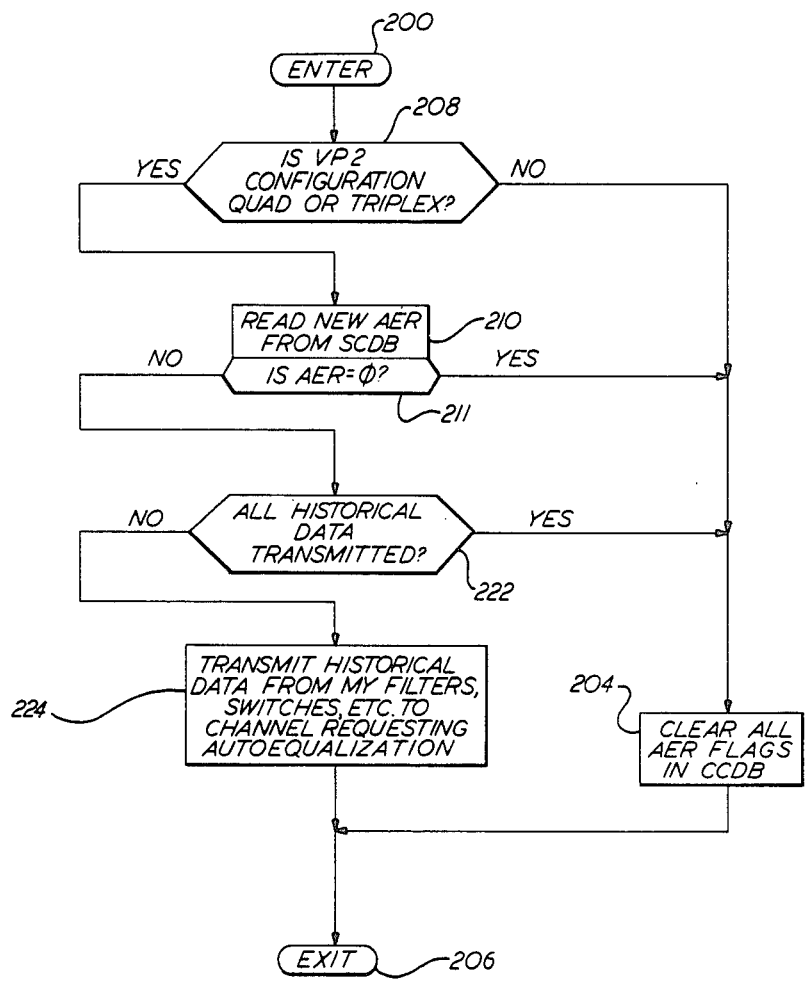
FIG. 5 is a flowchart illustration of an autoequalization response subroutine.

Referring now to FIG. 5, a flowchart illustration is presented of the logical steps required to be executed by each channel in the quadraplex system to determine whether or not it is being called upon to transmit historical data to a channel requesting autoequalization and, if so, to effect such a transfer of data. The flowchart of FIG. 5, like FIG. 4, represents only a small portion of the total scope of the autoequalization process but typifies the procedure as illustrated in the special case of voting plane 2 and may be characterized as describing "autoequalization transmit" processing for VP2.

After entering the subroutine illustrated in FIG. 5 in a step 200, a step 208 is next executed in which a determination is made as to whether or not the system's voting plane 2 configuration is still quadraplex or triplex. If not, then step 204 is executed and an exit is made in step 206. No autoequalization will be permitted under such a circumstance.

If it is determined in step 208 that the system's voting plane 2 configuration is still quadraplex or triplex, the SCDB in that channel is consulted to read the present value of the AER as indicated in a step 210. If the AER is equal to zero, i.e., if the AER flag is not set, as indicated by a decision step 211 then step 204 and 206 are executed and the subroutine is exited.

If not, a step 222 is next executed in which a determination is made as to whether or not all historical data has been transmitted in connection with an autoequalization request. If so, then step 204 and 206 are executed in which all AER flags in the CCDB are cleared and an exit is made from the subroutine. If all the historical has not been transmitted then a step 224 is next executed in which additional historical data from the subject channel's filters, switches, etc., are transmitted in a hierarchical, chronological manner to the channel requesting autoequalization. Step 206 is next executed and an exit is made from the subroutine.

The routines necessary to carry out the equalization and autoequalization procedures disclosed in the various channels of the redundant system can be programmed into any one or more signal processors in the system. Each channel may have its own signal processor dedicated or partially dedicated to this function as shown by a signal processor 250 in FIG. 6. An AER flag signal on a line 252 is provided to the signal processor in response to the miscompare signal on line 142. The signal processor will of course contain all of the basic building blocks of a modern signal processor including input/output ports, random access memory, read only memory, a central processing unit, an address bus, a data bus, etc. The signal processor would be replicated in each channel and would have all the equalization routines stored in its read only memory and would store historical values received from other channels in its random access memory for equalizing its own values in the presence of a miscompare. Thus there would be various control, data and address signal lines emanating from the signal processor channel of the redundant system of FIG. 1 for controlling the proper sequential distribution of the historical signal values to the various components within the channel. Of course, various signal processor(s) will already be embedded in the various channels and may be utilized for this purpose.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. A method for use in a redundant channel system having identically operating, synchronous channels, said method for attempting restoration to identical operation of a suspect channel presently providing non-identical output signal data, comprising the steps of:
   comparing configuration signal data bases in each channel to a voted configuration data base and identifying a channel in which a miscompare exists as suspect by providing a miscompare signal for that channel; and
   equalizing the suspect channel's historical signal data to that of a correctly operating channel in response to said miscompare signal, wherein said step of equalizing is effected by executing a series of equalizing substeps in a hierarchical, chronological manner, such that said equalizing of any particular signal magnitude in the suspect channel for a present comparison or computation step occurs at or after its generation in a correctly operating channel and before said comparison or computation step in said suspect channel.

2. The method of claim 1, further comprising the step of symmetrizing the suspect channel's configuration signal data base after equalizing its historical signal data.

3. The method of claim 1, further comprising the steps of:
providing an externally generated equalization command signal; and
equalizing the suspect channel's historical signal data to that of a correctly operating channel in response to said command signal.

4. Apparatus for use in a redundant channel system having identically operating, synchronous channels, the system having cross-channel data link means, responsive to configuration signal data bases resident in each channel, responsive to input signal data provided to all channels in the system and responsive to output signal data generated in all channels in the system for communicating all of said signal data between channels, said method for attempting restoration to identical operation of a suspect channel presently providing nonidentical output signal data, comprising:
means for comparing configuration signal data bases in each channel to a voted configuration data base and identifying a channel in which a miscompare exists as suspect by providing a miscompare signal for that channel; and
means responsive to said miscompare signal and to the signal data communicated between channels for equalizing the suspect channel's historical signal data to that of a correctly operating channel, wherein said equalizing means effects equalization by executing a series of equalizing substeps in a hierarchical, chronological manner, such that said equalization of any particular signal magnitude in the suspect channel for a present comparison or computation step occurs at or after its generation in a correctly operating channel and before said comparison or computation step in said suspect channel.

5. The apparatus of claim 4, further comprising means for symmetrizing the suspect channel's configuration signal data base after equalizing its historical signal data.

6. The apparatus of claim 4, wherein said means responsive to said signal data communicated between channels is also responsive to an externally generated equalization command signal for equalizing the suspect channel's signal data to that of a properly functioning channel.

7. A method for use in a redundant channel system having identically operating, frame synchronous channels, said method for attempting restoration to identical operation of a suspect channel presently providing nonidentical output signal data, comprising the steps of:
comparing configuration signal data bases in each channel to a voted configuration data base and identifying a channel in which a miscompare exists as suspect by providing a miscompare signal for that channel; and
equalizing the suspect channel's historical signal data to that of a correctly operating channel in response to said miscompare signal, wherein said step of equalizing is effected by executing a series of equalizing steps within a corresponding series of frames, each equalizing step for a corresponding frame being made up of a series of equalizing substeps corresponding to a series of normal computational substeps in that frame, said equalizing substeps being executed in a hierarchical, chronological manner corresponding to the execution of said normal computational substeps in said frame, such that said equalizing of any particular signal magnitude in the suspect channel for a present frame comparison or computation step occurs at or after its generation in a previous frame in a correctly operating channel and before said comparison or computation step in said suspect channel.

* * * * *